Figure 3:
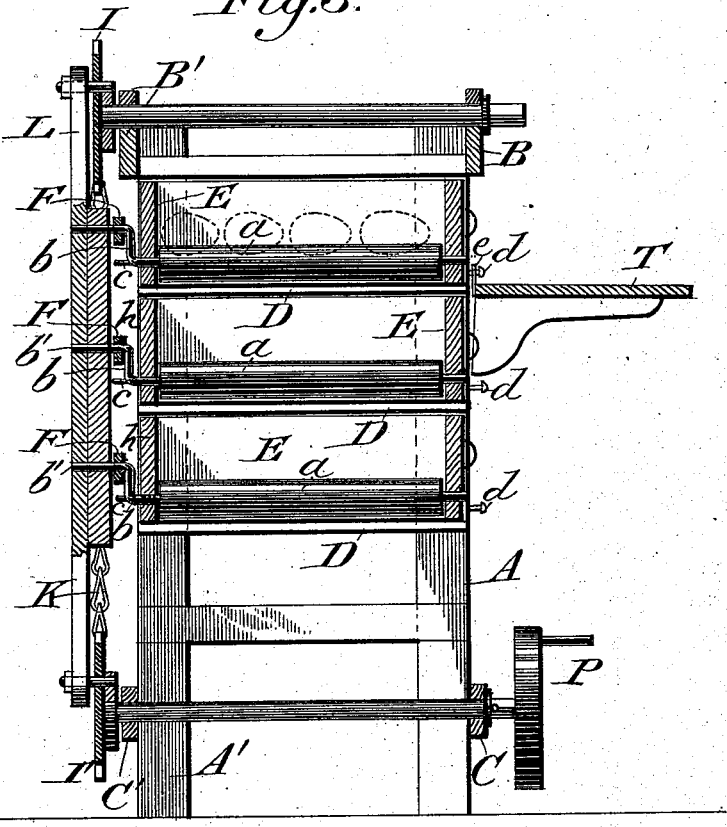

(No Model.) 3 Sheets—Sheet 1.
A. F. TEMPLE.
EGG PRESERVER.
No. 377,585. Patented Feb. 7, 1888.
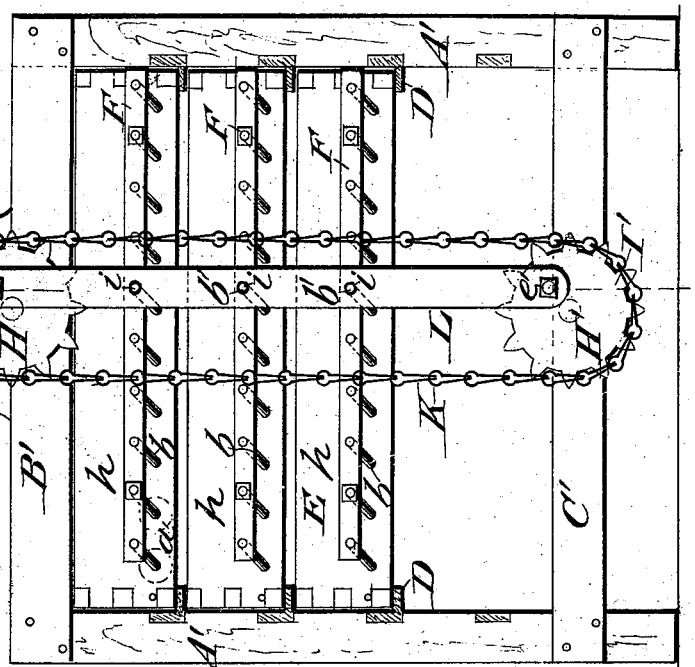
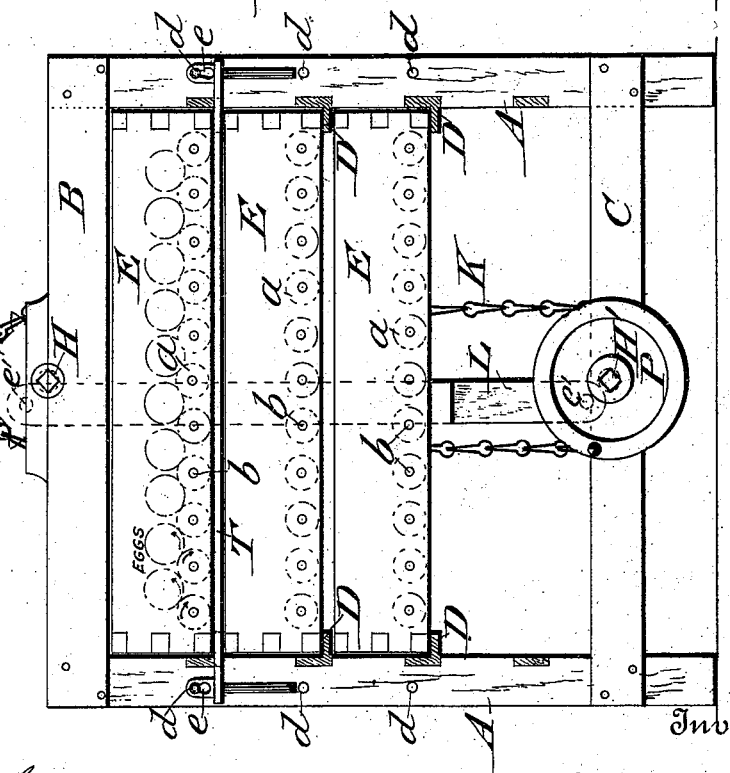
Witnesses
F. H. Schott
G. W. Burroughs.
Inventor
A. F. Temple
By his Attorney
M. T. E. Chandler (No Model.) 3 Sheets—Sheet 2.

A. F. TEMPLE.
EGG PRESERVER.

No. 377,585. Patented Feb. 7, 1888.

Witnesses
F. H. Schott
G. W. Burroughs

Inventor
A. F. Temple
By his Attorney
W. H. Chandler

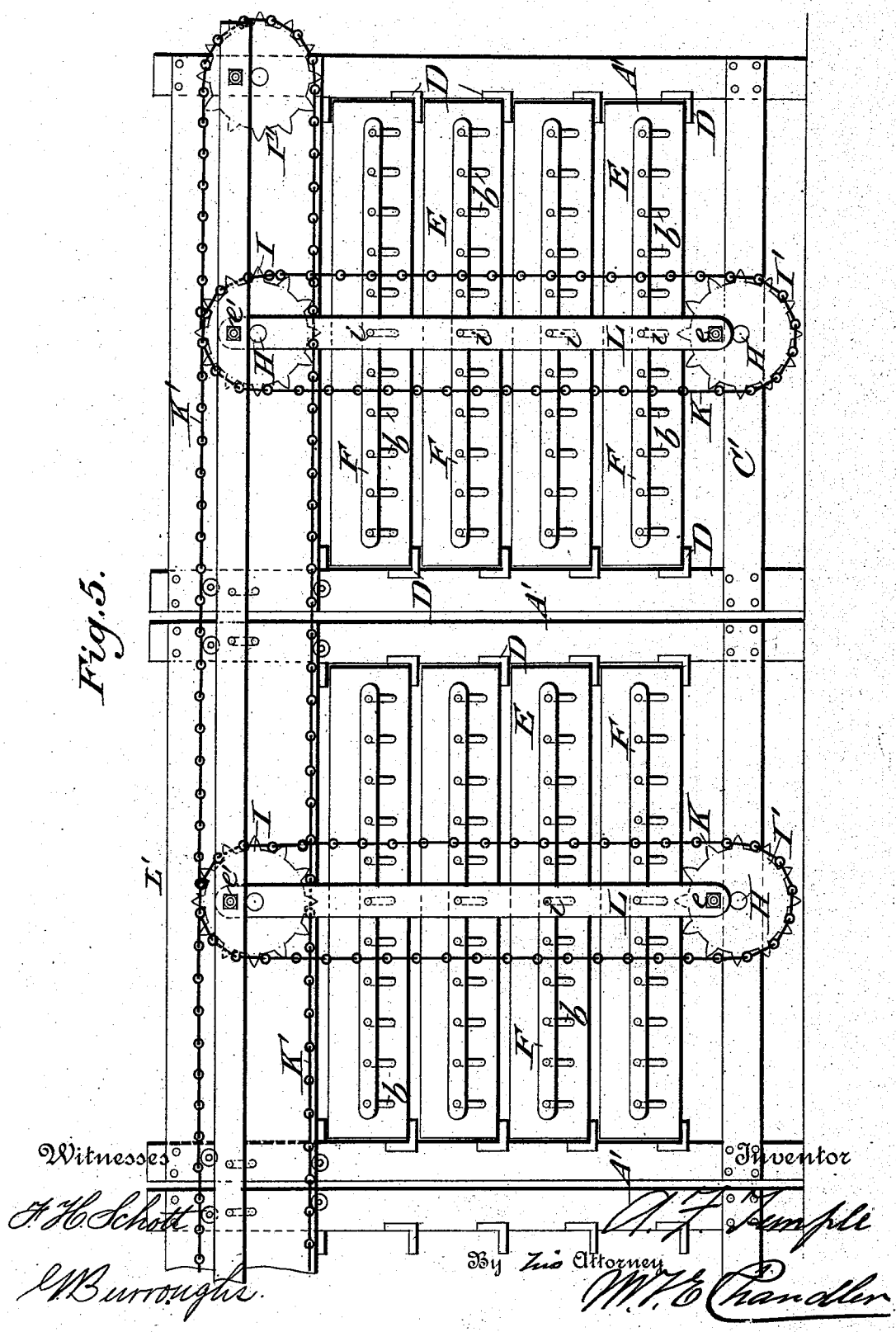

UNITED STATES PATENT OFFICE.

ANSEL F. TEMPLE, OF MUSKEGON, MICHIGAN.

EGG-PRESERVER.

SPECIFICATION forming part of Letters Patent No. 377,585, dated February 7, 1888.

Application filed August 25, 1887. Serial No. 247,845. (No model.)

*To all whom it may concern:*

Be it known that I, ANSEL F. TEMPLE, a citizen of the United States, residing at Muskegon, in the county of Muskegon and State of Michigan, have invented certain new and useful Improvements in Gang Egg-Preservers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in that class of egg-preserving devices in which eggs are placed in trays provided with means for turning the eggs mechanically, when desired. Among the most successful of these is one in which the trays have a bottom composed of a series of rollers placed side by side, the journals of said rollers projecting from one side of the tray and each provided with a crank, the several cranks being connected by a bar, the movement of which rotates all the rollers simultaneously, thus turning the eggs; which action being performed daily prevents the yelk of the egg from settling through the white, thus coming in contact with the shell, experience having demonstrated that all that is required to preserve them in a perfectly-fresh condition for comparatively long periods is to so manipulate them as to prevent such contact of the yelk with the shell.

This device as now constructed is limited in its application to household use, or to places where but a comparatively small number of eggs are to be treated, as each tray being independent they must be manipulated singly, thus taking up much time when a number of them are in use. To fit these trays for the handling of large quantities of eggs with the least possible loss of time is the object of the present invention, which consists in the construction of frames capable of containing fifteen to twenty of these trays, so that each frame will carry from four to five thousand eggs, and connecting the series of rollers in each tray with a single centrally-placed crank and these cranks with rods connecting all the trays in a frame, and these may be again connected by rods and pitch-chains with several frames placed side by side, so that by the turning of a single crank all the rollers throughout the whole system of trays in the frame or frames may be turned simultaneously, thus permitting the whole to be turned in the same time that would ordinarily be required for the manipulation of a single tray; and, further, in the construction of said frame and trays in such a manner that any single tray of a system may be removed and replaced without disturbing any of the others or disarranging their connection with the turning mechanism, and still further in a movable and adjustable table attached to the front of the frame to receive the trays when drawn out.

Figure 4:
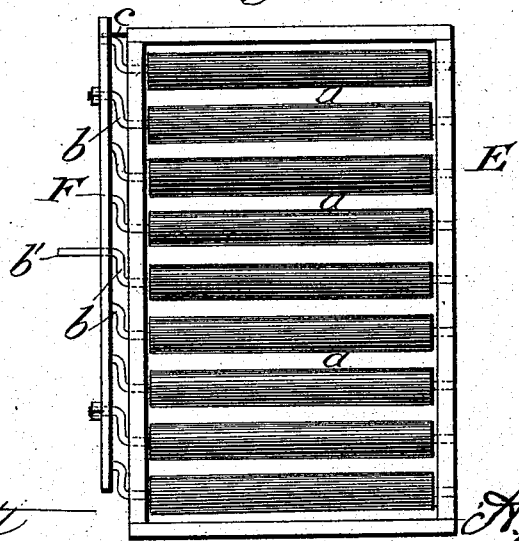

In the accompanying drawings, in which the same letters of reference indicate like parts in the different figures, Figure 1 is a front elevation of the frame, showing the arrangement of the trays therein and the movable table upon which they are drawn out. Fig. 2 is a rear elevation, illustrating the means by which the series of rollers in each tray and the whole system of trays are connected, so that all the rollers upon which the eggs rest in the whole frame may be turned simultaneously. Fig. 3 is a vertical transverse section on the line *x x* of Fig. 2. Fig. 4 is a plan of one of the trays removed from the frame. Fig. 5 is a side elevation, showing a series of frames connected.

In constructing these frames I prefer to employ four posts, A A', one at each corner. These posts are connected at the top of the frame by the pieces B B', each of which connects a pair of posts, the lower ends of each pair being united by the pieces C C', while the pairs of posts are connected transversely by the rabbeted pieces D D, which are let into recesses cut in said posts, and not only unite them, but form the supports upon which egg-carrying trays E are carried and slide. As many of these frames as desired may be placed end to end and connected, as will be hereinafter described. These trays consist of a rectangular frame the bottom of which is composed of a series of rollers, *a a*, journaled in the frame. Said journals at one end of the rollers extend through the frame and form cranks *b b*, the pins of which pass through a bar, F, pierced with a series of holes to receive them at a distance equal to the distance from the axis of one roller to that of the next, the bar being retained in position upon the crank by nuts screwed onto the ends of two or more of the crank-pins. It is therefore apparent that by moving the bar F all the rollers in a tray will be turned together, and consequently will turn all the eggs resting thereon. In order to prevent too great a movement of the rollers, a pin, c, is inserted in the tray at one end and prevents the cranks from being carried by the bar through a complete revolution. In constructing these trays the front side piece, h, which is preferably connected with the end pieces by dovetails, has a cut made partly through it on the line of the perforation through which the cranks pass. The side piece is then split on this line, so that the cranks (which are all machine-made and inserted in the rollers) may be placed in position in the tray without difficulty, and when the two parts of the side pieces are again brought together and the ends screwed to the end pieces the tray will be completed ready for use. Each pair of the supports D carry one of these trays, which slide out and in on said supports.

A table, T, is adjustably secured to the posts A A by means of the slotted ears e e, which engage with the headed pins d d, inserted, two for each tray, in the posts at opposite ends of the machine, so that the table may be placed in position to receive either tray in the frame when it is desired to remove its contents or replenish it with fresh eggs. The mechanism by which all the trays in a frame are connected to allow the rollers forming their bottoms to be simultaneously rotated consists of the following arrangement of devices:

Across the top of the frame, resting in suitable journal-boxes on the pieces B and B', is a shaft, H, and crossing the lower part of the frame, supported by the pieces C C', is a similar shaft, H'. These shafts project beyond their bearings at both ends, and these projecting ends at the rear of the frames each carry a sprocket-wheel, as I and I', which wheels are united by a chain, K, thus causing the two shafts H and H' to be synchronous in their movement. Crank-pins e e' are attached to the sprocket-wheels and carry the opposite ends of a connecting-bar, L. This bar, therefore, occupies a vertical position at one side of the frame, and when the sprocket-wheels are turned travels with the crank-pins inserted therein. A series of holes, i, are bored through the bar L at a distance apart equal to the vertical space occupied by each tray, which holes receive an extension, b', of one of the crank-pins b after it has passed through the bar F.

When several frames are employed, placed end to end, as shown in Fig. 5, the crank-pins e' of their sprocket-wheels I may all be connected by a horizontal bar, L', and said wheels I by the endless horizontal chain K', thus connecting all the rollers of the trays and frames, forming the apparatus in such a manner that they may be readily operated from a single point.

From this construction it is evident that upon the rotation of either the upper or lower shaft the whole system of rollers contained in the several trays and frames will be simultaneously rotated, consequently causing the eggs thereon to be turned.

In order to furnish a convenient means for rotating the shafts, their projecting ends at the front of the frame are square, and a hand-crank, P, is provided having a square opening fitting the ends of each shaft, so that it may be transferred from one to the other at will.

The operation of the several parts of this apparatus will be readily understood from this description of its construction, and the great advantage it presents for the handling and preservation of eggs in large quantities over that presented by the use of single trays will be apparent.

Having thus described my invention, I claim as new, and desire to secure by Letters Patent, the following:

1. The combination of a rectangular frame provided with cleats D, a series of trays fitted to rest one above another upon the said cleats, the bottom of each tray being formed of rollers and each roller having a crank projecting beyond one side of the tray, a horizontal bar connecting all the cranks of each tray, and a vertical bar attached to one crank of each tray, thereby connecting the several trays, substantially as shown and described.

2. The combination of a rectangular frame, a series of trays fitted to slide one above another into the said frame and to be supported therein, the bottom of each tray being formed of rollers, and each roller having a crank at one end, a horizontal bar beside each tray connecting all the cranks thereof, and a single vertical bar supported upon the frame and provided with a hole on the level of each tray to receive a crank thereof.

3. The combination of a rectangular frame, two wheels journaled therein, one over the other, and provided with cranks, a vertical bar connecting the said cranks and provided with a series of holes, i, a series of trays fitted to slide into the said frame and provided with bottoms formed of rollers, each roller having a crank at one end, horizontal connections between the cranks of each tray, and a crank of each tray adapted to register with the said holes i of the vertical bar, substantially as shown and described.

In testimony whereof I affix my signature in presence of two witnesses.

ANSEL F. TEMPLE.

Witnesses:
R. A. FLEMING,
DAR LUTHER.